Dec. 10, 1929.   B. C. VON PLATEN ET AL   1,738,678
REFRIGERATION
Original Filed June 3, 1927
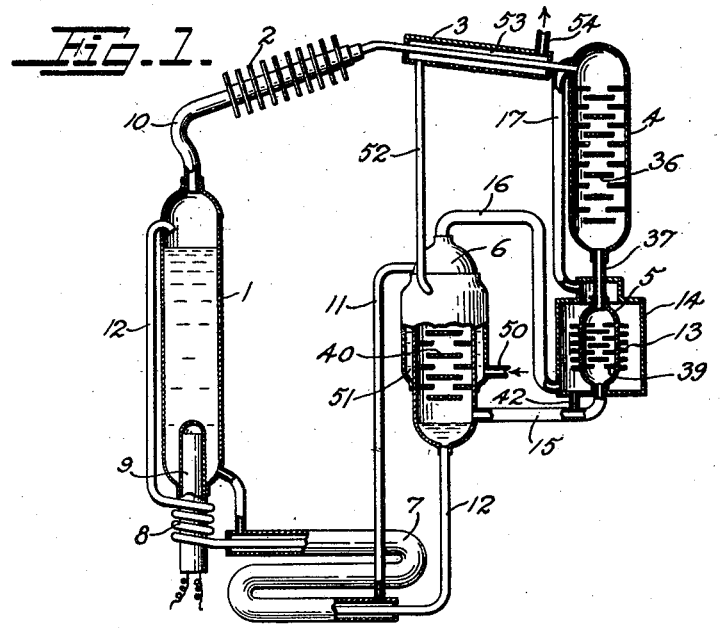
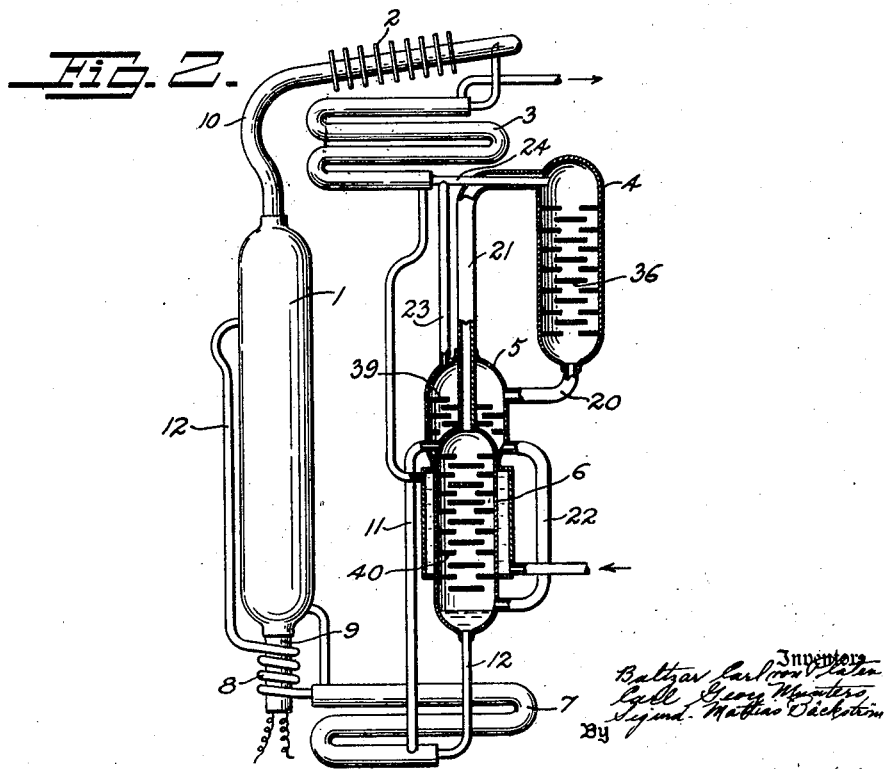

Patented Dec. 10, 1929

1,738,678

UNITED STATES PATENT OFFICE

BALTZAR CARL VON PLATEN, CARL GEORG MUNTERS, AND SIGURD MATTIAS BÄCKSTRÖM, OF STOCKHOLM, SWEDEN, ASSIGNORS TO ELECTROLUX SERVEL CORPORATION, OF NEW YORK, N. Y., A CORPORATION OF DELAWARE

REFRIGERATION

Original application filed June 3, 1927, Serial No. 196,179, and in Sweden June 9, 1926. Divided and this application filed March 3, 1928. Serial No. 259,963.

This application is a division of co-pending application Serial No. 196,179 filed June 3, 1927, which has matured into Patent Number 1,711,553.

Our invention relates to the art of refrigeration and relates particularly to that type of absorption system wherein a constant total pressure is maintained throughout. In such a system, refrigeration is usually effected by the diffusion of the refrigerant into a gas which is inert with respect to the refrigerant. In apparati of this type, there is usually an excess of undiffused ammonia leaving the evaporator. It is difficult to supply just the right amount of fluid to a system of this type for complete diffusion without any liquid refrigerant leaving the evaporator. The present invention contemplates an excess of liquid refrigerant leaving the evaporator proper and the subsequent utilization of the latent heat of vaporization of such excess.

One object of the present invention is the utilization of excess undiffused liquid refrigerant to obtain low pressure in the system. This and other objects of the invention will be apparent from the following description.

On the accompanying drawings:

Fig. 1 shows more or less diagrammatically an absorption system in which one form of the invention is embodied; and Fig. 2 shows another application of the invention wherein a different arrangement of parts is used.

Referring more particularly to Fig. 1, reference character 1 designates a generator wherein is contained the refrigerant or cooling agent in solution in an absorbing liquid. For convenience in reference let it be assumed that the refrigerant is ammonia and the absorption liquid is water. Generator 1 is heated in any convenient way, as for instance, by the electrical resistance coil 9. The heat thus applied to the generator and its contents drives the ammonia out of solution. The gaseous ammonia passes upwardly through conduit 10 to the air-cooled rectifier or radiator 2 where any entrained water vapor is condensed and flows by gravity back to the generator. The ammonia vapor free from water passes into condenser 3 where it is cooled by cooling water or other means and is liquefied. The liquid ammonia flows downwardly through condenser 3 to the upper part of the primary evaporator 4 which is the regular or ordinary evaporator of the type of system dealt with in Patent No. 1,609,334 of December 7, 1926. An auxiliary agent, a gas inert with respect to ammonia, for instance hydrogen, also enters the top of the evaporator 4 through conduit 17. The ammonia diffuses into the hydrogen, producing refrigeration. Diffusion and evaporation in the evaporator are aided by disks 36 placed therein.

The mixture of ammonia and hydrogen formed in the evaporator has a greater specific weight than the relatively pure hydrogen which enters the evaporator at the top through conduit 17. Hence the mixture of gaseous ammonia and hydrogen and excess liquid ammonia that has not evaporated passes downwardly through the evaporator 4 and through conduit 37 to a vessel 5 situated below primary evaporator 4 which will hereinafter be referred to as the secondary evaporator. Within the secondary evaporator 5 is a series of disks 39 which aid in the complete evaporation of the liquid ammonia which enters the vessel. This evaporation absorbs heat from hydrogen in vessel 14, as will be explained more fully later.

The gaseous mixture of ammonia and hydrogen passes out from the bottom of the secondary evaporator 5 through conduit 15 to the lower part of absorber 6. Absorption liquid which contains but little ammonia in solution enters the top of the absorber 6 through conduit 11 and falls down over disks 40 placed within the absorber and comes in contact with the ammonia-hydrogen mixture. The ammonia is absorbed by the absorption liquid and the hydrogen remains. This comparatively pure hydrogen is lighter than the ammonia-hydrogen mixture and passes upwardly through the absorber and through conduit 16 to the bottom of cooling vessel 14 and thence through conduit 17 to the top of the primary evaporator. Members 4, 37, 5, 15, 6, 16, 14 and 17 form a local cycle of circulation for hydrogen of which there is a down-leg in the evaporators and conduit 37 and an up-leg in the absorber and conduit 17, the heavier specific gravity of fluids in the down-leg serving to cause continuous circulation in the local cycle. Vessel 14 is arranged in heat exchange relation with the secondary evaporator 5 and the hydrogen in cooling vessel 14 is cooled by evaporation of ammonia in the secondary evaporator as it diffuses into hydrogen therein. Fins 13 are supplied on the secondary evaporator 5 to increase the rate of heat transfer from the hydrogen. In order to prevent accumulation of water in vessel 14 which may be entrained with hydrogen passing through conduit 16, a small drain conduit 42 is connected between vessel 14 and conduit 15. Water condensate in vessel 14 flows through conduits 42 and 15 into the absorber.

The absorption liquid which contains ammonia in solution passes out of the bottom of absorber 6 through conduit 12, a portion of which is arranged as a coil 8 around the heating element 9 so as to form a thermo-siphon. This thermo-siphon causes the liquid to flow upwardly through conduit 12 from which it is discharged into the upper part of the generator 1 at a level of liquid above that maintained in the absorber 6. In the generator the ammonia is driven out of solution as previously described and thus completes its cycle.

The absorption liquid flows downwardly through the generator and through conduit 11 to the top of the absorber and thus its cycle is completed. This flow of the absorption liquid takes place because the thermo-siphon member 8 maintains a level of liquid in the generator above the point of discharge from conduit 11 into the absorber 6. Conduits 11 and 12 may be arranged in heat-exchange relation as at 7, so that the hot liquid which comes from the generator will be cooled before it enters the absorber while at the same time the relatively cold liquid which comes from the absorber is heated before it enters the thermo-siphon. Cooling water for the absorber and condenser is supplied through conduit 50, passes through jacket 51, thence through conduit 52, through jacket 53 of the condenser and out through conduit 54.

It will be noted that it is the latent heat of vaporization of the ammonia which cools the hydrogen in vessel 14 rather than merely the heat of superheat which was previously used for this purpose as disclosed in the patent above referred to. By using the latent heat of vaporization, a greater cooling effect can be obtained than with merely transfer of the heat of gas.

Considering the members 4 and 5 as one combined unit, it might be said that the hydrogen passes in heat exchange relation with a portion of the outlet end of the evaporator before entering the evaporator. Conduit 37 constitutes a colder portion of the evaporator as a whole than the actual outlet end.

The cycles of operation of the apparatus shown in Fig. 2 are, in general, similar to those described above. Gaseous ammonia passes from the generator 1 through conduit 10 and rectifier 2 into condenser 3. The liquid ammonia which leaves the condenser divides, however, and a small proportion thereof flows through a narrow conduit 23 directly to secondary evaporator 5 while the remainder flows to evaporator 4. Evaporation of the ammonia takes place in the evaporator in the same manner as described in connection with Fig. 1. The ammonia-hydrogen mixture and any liquid ammonia that has not evaporated in its passage through the evaporator flows through conduit 20 to the top of secondary evaporator 5 where it joins the liquid ammonia which is here introduced through conduit 23. Secondary evaporator 5 is so constructed and arranged as to surround the upper part of absorber 6 and the lower portion of conduit 21 which conducts hydrogen from the upper part of the absorber to the upper part of the evaporator. Secondary evaporator 5 is provided with a series of baffle plates or disks 39. The liquid ammonia which enters secondary evaporator 5 through conduits 23 and 20 diffuses into and evaporates in the presence of the hydrogen in a manner similar to that previously described in connection with Fig. 1.

In Fig. 2, it will be seen that evaporation serves to cool the absorption liquid which enters the absorber as well as the hydrogen which leaves the absorber. This is accomplished partly by arranging conduit 11 to pass partly through secondary evaporator 5 and partly by transfer of heat from absorption liquid on the upper disks in the evaporator to the fluid within the secondary evaporator. Three fluids are here in heat exchange relation: (1) the mixture of ammonia and hydrogen; (2) liberated hydrogen; and (3) absorption liquid.

The ammonia-hydrogen mixture passes from secondary evaporator 5 through conduit 22 to absorber 6 where the ammonia is absorbed by the absorption liquid which has been cooled by the secondary evaporator. The hydrogen passes upwardly through the absorber and conduit 21 to the evaporator. The absorption liquid which contains ammonia in solution flows from absorber 6 through conduit 12 to generator 1 in the same manner as was described in reference to Fig. 1.

While we have described several forms of our invention, it is to be understood that we are not limited to the structures shown and described but that the invention is to be

Having thus described our invention, what we claim is:

1. Refrigerating apparatus comprising a generator, a condenser, a primary evaporator, a secondary evaporator, an absorber, conduits connecting said generator, condenser, primary evaporator, secondary evaporator and absorber to form a system, said system containing a refrigerant and an inert gas, a plurality of disks in each of said primary evaporator, said secondary evaporator and said absorber for obtaining large surfaces for gas and liquid contact and one of said conduits being arranged in heat exchange relation with said second evaporator.

2. In an absorption system, a plurality of evaporators connected in series, a condenser connected to supply liquid refrigerant in parallel to the evaporators and means to flow an inert gas through the evaporators.

3. Refrigerating apparatus comprising, in combination, a generator, a condenser, a primary evaporator, a secondary evaporator, an absorber, means to conduct fluid from said generator to said condenser, from said condenser to said primary evaporator, from said primary evaporator to said secondary evaporator and from said secondary evaporator to said absorber, means to conduct a small amount of liquid from said condenser to said secondary evaporator, circulation means between said generator and absorber and means to conduct fluid from said absorber to said primary evaporator in heat exchange relation with said secondary evaporator.

4. Refrigerating apparatus comprising, in combination, a generator, a condenser, a primary evaporator, an absorber, a secondary evaporator in heat exchange relation with said absorber and means to circulate fluid locally through the absorber, primary evaporator and secondary evaporator, locally through the generator and absorber and, in a major cycle, through the generator, condenser, primary evaporator, secondary evaporator and absorber.

5. Refrigerating apparatus comprising, in combination, a generator, a condenser, a primary evaporator, a secondary evaporator, an absorber, a plurality of disks in said primary evaporator, a plurality of disks in said secondary evaporator, a plurality of disks in said absorber, means to conduct fluid from said generator to said condenser, from said condenser to said primary evaporator, from said primary evaporator to said secondary evaporator, from said secondary evaporator to said absorber and from said absorber to said primary evaporator, the last passing in heat exchange relation with the secondary evaporator and circulation means between the generator and absorber.

In testimony whereof we have hereunto affixed our signatures.
BALTZAR CARL von PLATEN.
CARL GEORG MUNTERS.
SIGURD MATTIAS BÄCKSTRÖM.